United States Patent [19]

Furuya et al.

[11] 4,385,317

[45] May 24, 1983

[54] SPECIMEN IMAGE DISPLAY APPARATUS

[75] Inventors: Toshihiro Furuya; Osamu Yamada, both of Katsuta, Japan

[73] Assignee: Hitachi, Ltd., Tokyo, Japan

[21] Appl. No.: 134,284

[22] Filed: Mar. 26, 1980

[30] Foreign Application Priority Data

Mar. 28, 1979 [JP] Japan .................................. 54-36691

[51] Int. Cl.³ .......................... H04N 5/30; H04N 7/18
[52] U.S. Cl. ...................................... 358/93; 250/310; 250/311
[58] Field of Search .......................... 358/93, 107, 110; 340/721, 731, 734; 250/310, 311, 307

[56] References Cited

U.S. PATENT DOCUMENTS

| | | | |
|---|---|---|---|
| 3,835,246 | 9/1974 | Muller et al. | 250/311 |
| 4,039,829 | 8/1977 | Kato et al. | 250/310 |
| 4,206,349 | 6/1980 | Kamimura | 250/311 |

FOREIGN PATENT DOCUMENTS 53-47262  4/1978  Japan .

OTHER PUBLICATIONS

Tektronis Products, 1976–pp. 74–75–Tektronis Inc.

Primary Examiner—Joseph A. Orsino, Jr.
Attorney, Agent, or Firm—Antonelli, Terry & Wands

[57] ABSTRACT

A specimen image display apparatus is disclosed in which a specimen signal generated when the surface of a specimen is radiated while being scanned by an electron beam is detected, and this detection signal is used to display a magnified image of the specimen on a cathode ray tube. In addition to the specimen image, a scale of fixed length which remains unchanged regardless of the magnification of the specimen image and a character indicating converted scale are displayed on the cathode-ray tube, thus improving the accuracy of the measurement of the length of the specimen image on the cathode-ray tube.

6 Claims, 4 Drawing Figures

F I G. 1
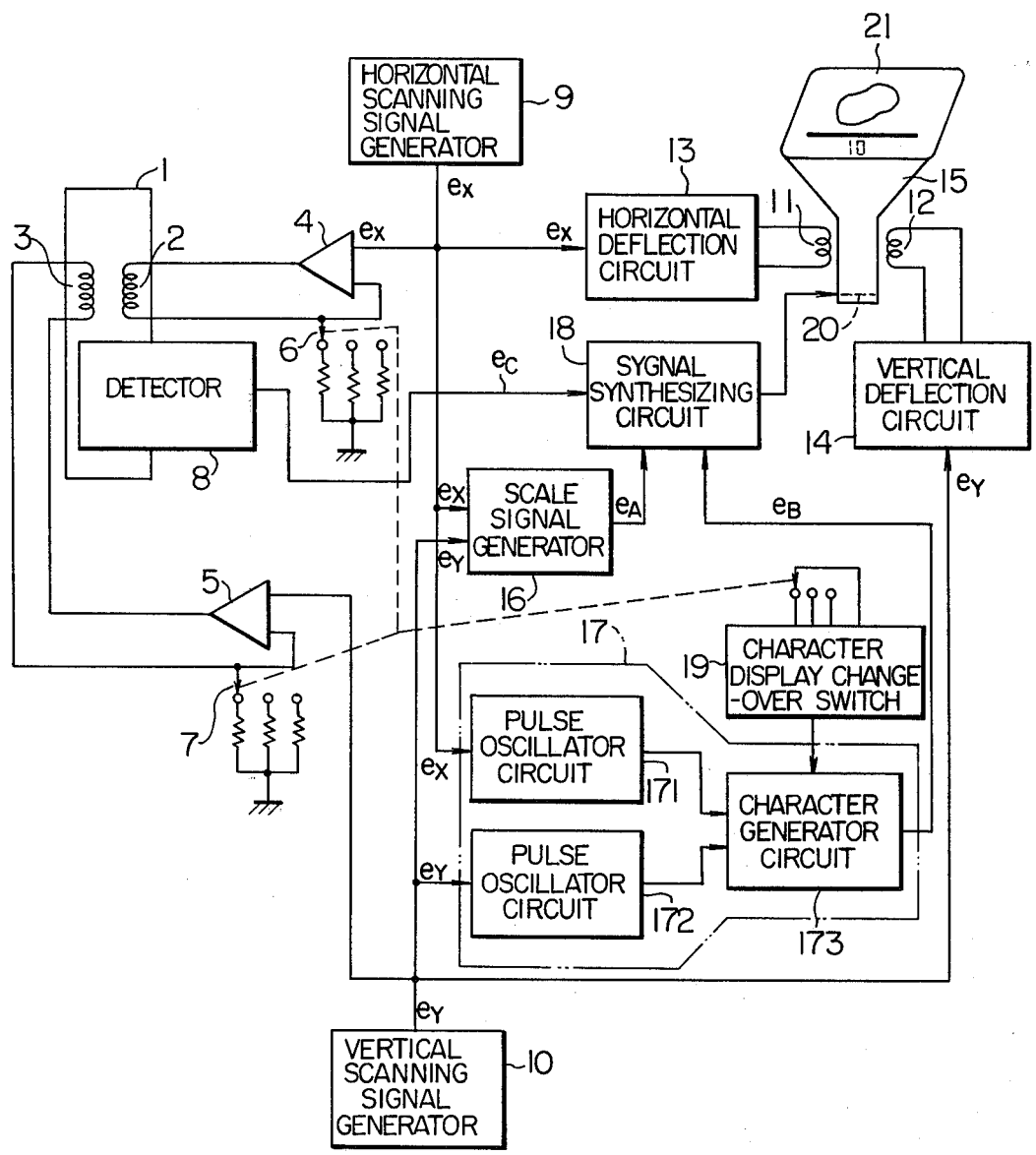

SPECIMEN IMAGE DISPLAY APPARATUS

BACKGROUND OF THE INVENTION

1. Field of the Invention

The present invention relates to a specimen image display apparatus used with a scanning electron microscope, an X-ray micro-analyzer or a similar device.

2. DESCRIPTION OF THE PRIOR ART

In a scanning electron microscope, specimen signals including secondary electrons, reflected electrons, absorbed electrons or transmitted electrons generated by the scanning of an electron beam on the surface of a specimen are detected, and the resulting detection signal is used to display a magnified image of the specimen on a cathode-ray tube of the specimen image display apparatus. The magnification of the specimen image on the cathode-ray tube is expressed by the ratio between the scanning width of the electron beam scanning the surface of the specimen and the scanning width of the beam on the cathode-ray tube for displaying the specimen image. For instance, let the horizontal scanning width of the beam on the cathode-ray tube be $x_1$ and the horizontal scanning width of the electron beam on the surface of the specimen be $x_2$. Then the magnification M of the specimen image on the cathode ray tube is given as $M = x_1/x_2$.

In observing or photographing the specimen image displayed on the cathode-ray tube, the length of the specimen image is measured. Conventional scanning electron microscopes are so constructed that for the purpose of measuring the length of the specimen image, a scale used for measuring the length of the specimen is displayed in addition to the specimen image on the cathode-ray tube. This method of display is disclosed in Japanese Patent Laid-Open No. 47262/78. The length of this scale changes with the degree of magnification of the specimen image on the cathode-ray tube, and therefore it is possible to measure the length of the specimen image on the cathode-ray tube using the scale displayed on the cathode ray tube as a reference.

In view of the fact that the scale on the cathode ray tube changes with the magnification of the specimen image as mentioned above, however, it is difficult to measure the length of the specimen image accurately in the range of magnification where the scale is displayed in short form.

SUMMARY OF THE INVENTION

Accordingly, it is an object of the present invention to provide a specimen image display apparatus which makes possible accurate measurement of the length of the specimen image displayed on the cathode-ray tube over any range of magnification.

According to the present invention, there is provided a specimen image display apparatus comprising means for displaying a scale on the cathode ray tube, which scale has a fixed length regardless of changes in magnification of the specimen image on the cathode ray tube on the one hand and has a sufficient length to permit accurate measurement of the specimen image on the other hand, and means for displaying a numeral or character indicating the length of a converted scale in the magnification of the specimen, in other words the numeral indicating a unit of the scale.

BRIEF DESCRIPTION OF THE DRAWINGS

FIG. 1 is a diagram showing an embodiment of the present invention applied to a specimen image display apparatus for the scanning electron microscope.

DESCRIPTION OF THE PREFERRED EMBODIMENTS

Figure 2:
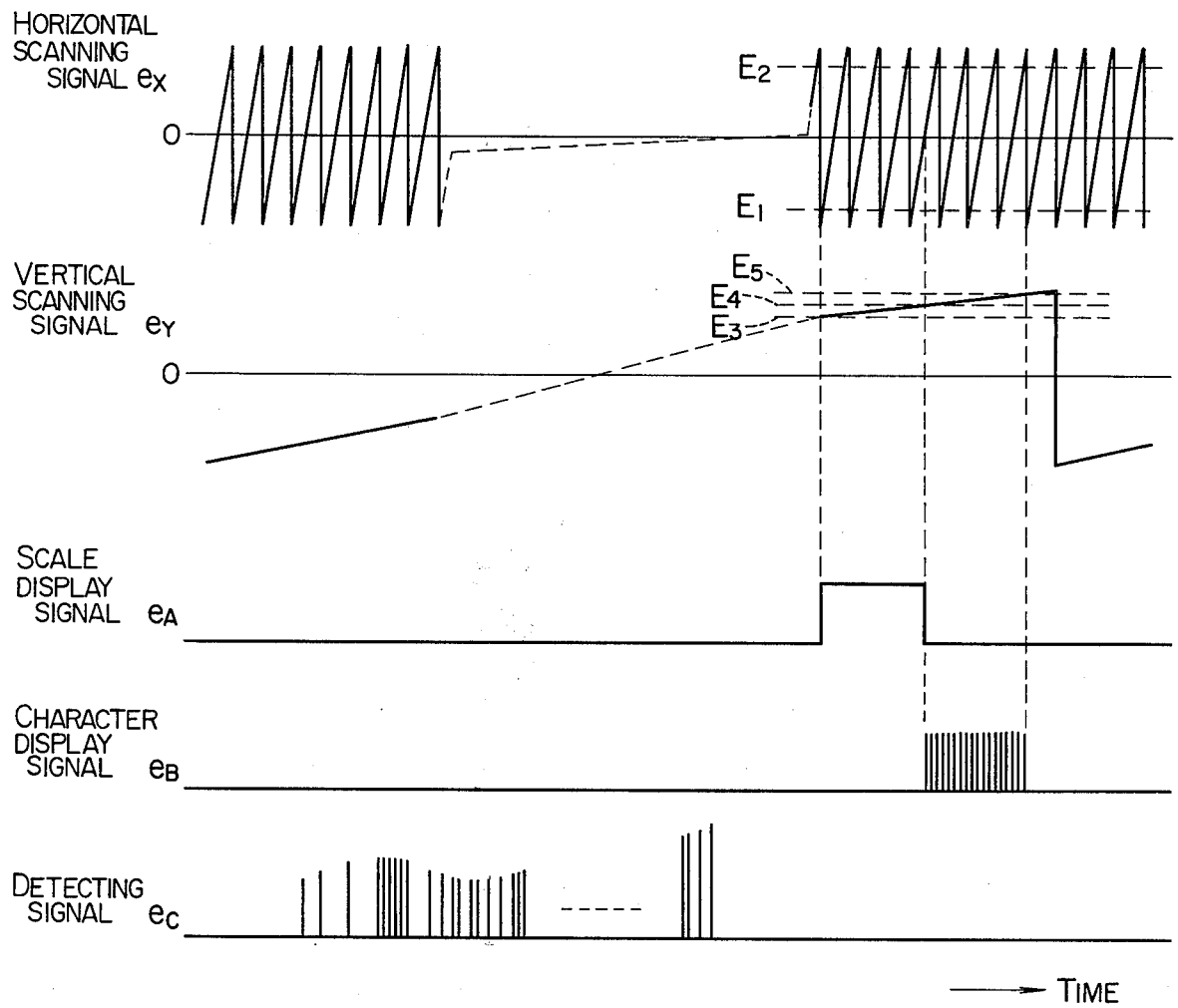
FIG. 2 shows waveforms for explaining the operation of the apparatus shown in FIG. 1.
Figure 3A:
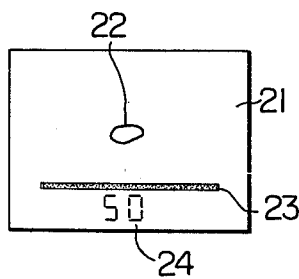
FIGS. 3A and 3B are diagrams showing examples of display on the cathode ray tube of the apparatus of FIG. 1.
Figure 3B:
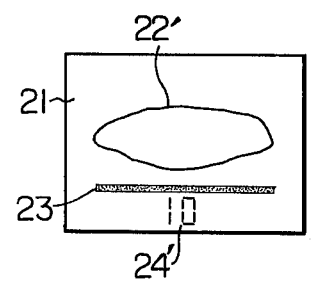

A block diagram of a specimen image display apparatus for the scanning electron microscope according to an embodiment of the present invention is shown in FIG. 1. Waveforms for explaining the operation of the apparatus of FIG. 1 are shown in FIG. 2. Also, examples of display on the cathode-ray tube are shown in FIGS. 3A and 3B. The apparatus of FIG. 1 will be described below with reference to FIGS. 2, 3A and 3B.

In the scanning electron microscope proper 1, an electron beam emitted from an electron beam source not shown is radiated on the surface of a specimen while at the same time scanning the same by the operation of a horizontal deflection (X-axis) coil 2 and a vertical deflection (Y-axis) coil 3. The secondary electrons, reflected electrons, absorbed electrons, transmitted electrons and the like produced from the specimen in this process are detected by a detector 8. The specimen signal thus detected by the detector 8 is applied to a signal synthesizing circuit 18 (described later) as a detection signal $e_C$ in the form of a pulse. Deflection circuits 4 and 5 for exciting the deflection coils 2 and 3 of the scanning electron microscope 1 respectively are supplied with a horizontal scanning signal $e_X$ and a vertical scanning signal $e_Y$ in saw-tooth waveform as shown in FIG. 2 respectively produced from a horizontal scanning signal generator 9 and a vertical scanning signal generator 10. The exciting current supplied from the deflection circuit 4 to the deflection coil 2 is controlled by a magnification change-over switch 6, while the exciting current supplied from the deflection circuit 5 to the deflection coil 3 is controlled by a magnification change-over switch 7. The magnification change-over switches 6 and 7 are in interlocked relation with a character display change-over switch 19 described later.

The horizontal scanning signal $e_X$ from the horizontal scanning signal generator 9 is applied to a horizontal deflection circuit 13 for controlling the exciting current for the horizontal deflection coil 11 of the cathode ray tube 15. The vertical scanning signal $e_Y$ produced from the vertical scanning signal generator 10, on the other hand, is applied to a vertical deflection circuit 14 for controlling the exciting current for the vertical deflection coil 12 of the cathode-ray tube 15. Therefore, when the magnitude of the exciting currents for the deflection coils 2 and 3 in the scanning electron microscope 1 is switched by the magnification change-over switches 6 and 7 respectively, the degree of magnification of the specimen image displayed on the screen 21 of the cathode-ray tube 15 changes.

The number of the scanning lines of the horizontal scanning signal for the cathode-ray tube 15 is set generally at two hundred and several tens in the screen about 15 cm long and about 13 cm wide of the cathode-ray tube used with an ordinary scanning electron microscope. In other words, in FIG. 2, the horizontal scanning signal $e_X$ effects two hundred and several tens of scans for each one scan of the vertical scanning signal $e_Y$.

The horizontal scanning signal $e_X$ and the vertical scanning signal $e_Y$ from the scanning signal generators 9 and 10 are respectively applied to a scale signal generator 16. In response to these two scanning signals $e_X$ and $e_Y$, the scale signal generator 16 produces a scale display signal $e_A$ as shown in FIG. 2. In the case of FIGS. 2, 3A and 3B, this scale display signal $e_A$ is indicative of the fact that the length of the scale 23 displayed on the screen 21 of the cathode-ray tube 15 is determined by the level $E_1$–$E_2$ of the horizontal scanning signal $e_X$, and that the width of the scale 23 is determined by the level $E_3$–$E_4$ of the vertical scanning signal $e_Y$.

The vertical scanning signal $e_Y$ is also applied to a character signal generator 17. The character signal generator 17 produces a character display signal $e_B$ while the vertical scanning signal $e_Y$ is between levels $E_4$ and $E_5$ in FIG. 2. The character display signal $e_B$ from the character signal generator 17 is regulated by a character display change-over switch 19 interlocked with the magnification change-over switches 6 and 7 for displaying the converted scale which is displayed on the screen of the cathode-ray tube 15. In this case, the character displayed on the screen 21 of the cathode-ray tube 15 indicates the converted length on the specimen of the scale, which converted length is inversely proportional to the magnification degree of the specimen image.

Now, the character signal generator 17 will be described. In displaying a character such as a numeral, letter or other symbol on the screen 21 of the cathode-ray tube 15, the portion of the screen where the character is to be displayed is divided longitudinally and transversely into small regions called picture elements, and those picture elements corresponding to the character to be displayed are supplied with a pulse signal by applying the pulse signal $e_B$ of FIG. 2 to the grid 20 of the cathode-ray tube 15 as a character signal $e_B$. Transverse divisions are called "rows" and longitudinal divisions are called "columns". These transverse and longitudinal divisions are formed in synchronism with the horizontal scanning signal $e_X$ and the vertical scanning signal $e_Y$ respectively.

A pulse oscillator circuit 171 produces a pulse signal corresponding to the rows of the picture elements divided as above in response to the horizontal scanning signal $e_X$, while a pulse oscillator circuit 172 produces a pulse signal corresponding to the columns of the picture elements in response to the vertical scanning signal $e_Y$. The character generator circuit 173 produces a pulse signal as a character signal $e_B$ shown in FIG. 2 in response to the pulse signals from the pulse oscillator circuits 171 and 172 and a signal corresponding to the character to be displayed in accordance with the magnification of the specimen image selected by the character display switch 19. An example used as this character generator circuit 173 is the ROM for Character Generator Model 3285 made by Fairchild Corporation.

The detection signal $e_C$ from the detector 8, the scale display signal $e_A$ from the scale signal generator 16 and the character display signal $e_B$ from the character signal generator 17 are synthesized at a signal synthesizer circuit 18 to produce a sum of $e_A$, $e_B$ and $e_C$ which is applied to the grid 20 of the cathode-ray tube 15.

As a result, a specimen image, the scale and a character are displayed on the screen 21 of the cathode-ray tube 21, as an example thereof is shown in FIGS. 3A and 3B. In FIGS. 3A and 3B, reference numerals 22 and 22' show a specimen image, numeral 23 a scale, numerals 24 and 24' characters. The numeral "50" of the character 24 in FIG. 3A indicates that the converted length on the specimen of the scale 23 is 50 $\mu$m. The numeral "10" of the character 24' in FIG. 3B similarly indicates that the converted length on the specimen of the converted scale 23 is 10 $\mu$m. The actual length of the scale 23 displayed, on the other hand, remains unchanged and is determined by the level $E_1$–$E_2$ of the horizontal scanning signal $e_X$ regardless of the magnification of the specimen image. The actual length of the scale 23 is selected at a value sufficient for accurate measurement of the length of the specimen image or, for instance, at a value as near as possible to the effective range of the screen 21 (about 70 to 80% of the screen width) of the cathode-ray tube 15. If the width of the scale 23 is determined to include several lines of the horizontal scanning signal $e_X$, the visibility of the scale itself is improved. The characters 24, 24' are displayed at the position determined by the level $E_4$–$E_5$ of the vertical scanning signal $e_Y$, namely, under the scale 23. The characters 24, 24' are not limited to numerals, but may be letters or other symbols. The characters 24, 24' may be displayed alternatively above or on the sides instead of under the scale. Further, the scale 23 and characters 24, 24' are preferably displayed at a lower part of the screen 21 of the cathode-ray tube 15 to facilitate the observation of the specimen image.

Furthermore, the scale 23 may take any of other alternative forms other than that shown in FIG. 3, such as a corrugation, a line with a partition on each end thereof, a line with a plurality of partitions at regular intervals thereon or partitions on both sides of a hypothetical line. In short, the actual length of the scale displayed on the screen 21 of the cathode-ray tube 15 is determined by the horizontal scanning signal $e_X$, and the position of the scale is determined by the vertical scanning signal $e_Y$, whereas the form of the scale may be appropriately determined as desired.

It will be thus understood from the foregoing description that according to the present invention a scale of a predetermined actual length which remains unchanged is displayed regardless of the magnification of the specimen image, thus contributing to an improved accuracy of the measurement of the length of the specimen image.

We claim:

1. A specimen image display apparatus comprising specimen-scanning means for detecting a specimen signal generated when the surface of a specimen is radiated while being scanned by an electron beam, display means including a display screen for displaying a magnified image of said specimen on said display screen in response to said detection signal from said specimen-scanning means, means for controlling said specimen-scanning means to selectively change the magnification of said displayed image on said display screen, and display control means for controlling said display means to simultaneously display on said display screen, in addition to said image of said specimen, a scale of fixed length regardless of the selected magnification of said image of said specimen and a character indicating a converted length on said specimen of said scale, said converted length being inversely proportional to the selected magnification of said specimen image and being varied each time the magnification is changed.

2. In a specimen image display apparatus for displaying a magnified image of a specimen on a cathode-ray tube on the basis of a specimen signal generated when the surface of said specimen is radiated while being scanned by an electron beam, including means for selecting the magnification of the specimen image to be displayed; the improvement comprising scanning signal generator means for generating at least two scanning signals which are supplied as scanning signals to said cathode ray tube, scale signal generation means for generating a scale signal for displaying a scale of fixed length on said cathode ray tube regardless of the magnification of said image of said specimen, the length of said scale being determined on the basis of one of said two scanning signals, the position of said scale being determined on the basis of the other of said scanning signals, means responsive to said magnification selecting means for generating a signal indicating the selected magnification of the specimen image, character signal generator means for generating a character signal for displaying a character indicating a converted length of said scale on said cathode-ray tube based on said signal indicating the selected magnification of said image of said specimen and said two scanning signals, said converted length being inversely proportional to the selected magnification of said specimen image and being varied each time the magnification is changed, and a signal synthesizer circuit for synthesizing and applying said specimen signal, said scale signal and said character signal to the grid of said cathode-ray tube.

3. A specimen image display apparatus according to claim 2, wherein said scale signal generator means generates a scale signal for displaying a scale in bar form.

4. A specimen image display apparatus according to claim 2, wherein said scale signal generator means generates a scale signal for displaying a scale in bar form at the lower part of the screen of said cathode-ray tube, and said character signal generator means generates a character signal for displaying a numeral adjacent said scale.

5. A specimen image display apparatus comprising specimen scanning means including electron beam generating means and a deflection coil for deflecting said electron beam for detecting a specimen signal generated when the surface of a specimen is radiated while being scanned by said electron beam, a cathode ray tube for displaying a magnified specimen image in response to a detection signal produced from said specimen scanning means, a scanning signal generator for generating a saw-tooth scanning signal, a first deflection circuit for controlling the exciting current for said deflection coil of said specimen scanning means in accordance with a selected magnification of the specimen image to be displayed on said cathode-ray tube by use of the scanning signals produced from said scanning signal generator, a second deflection circuit for controlling the exciting current for the deflection coils of said cathode-ray tube by use of the scanning signals produced from said scanning signal generator, a scale signal generator for generating a scale signal for displaying a scale of fixed length which remains unchanged regardless of the selected magnification of the specimen image displayed on said cathode-ray tube by use of the scanning signals produced from said scanning signal generator, means responsive to said first deflection circuit for generating a signal indicating the selected magnification of the specimen image displayed on said cathode-ray tube, a character signal generator for generating a character signal indicating a converted length on said specimen of said scale by use of the scanning signals from said scanning signal generator and said signal indicating the selected magnification of the specimen image, said converted length being inversely proportional to the selected magnification of said specimen image and being varied each time the magnification is selected, and a signal synthesizer circuit for synthesizing and applying said detection signal, said scale signal and said character signal to the grid of said cathode-ray tube.

6. A specimen image display apparatus according to claim 5, wherein said scale is displayed in bar form at the lower part of the screen of said cathode-ray tube and a numeral character is displayed adjacent said scale.

* * * * *